United States Patent

Blum et al.

[11] Patent Number: 5,223,582
[45] Date of Patent: Jun. 29, 1993

[54] POLYMERS CAPABLE OF OXIDATIVE CROSSLINKING

[75] Inventors: Harald Blum, Wachtendonk; Lothar Fleiter, Krefeld, both of Fed. Rep. of Germany

[73] Assignee: Bayer Aktiengesellschaft, Leverkusen, Fed. Rep. of Germany

[21] Appl. No.: 775,647

[22] Filed: Oct. 10, 1991

[30] Foreign Application Priority Data

Oct. 16, 1990 [DE] Fed. Rep. of Germany ....... 4032783

[51] Int. Cl.$^5$ ............................... C08F 8/32
[52] U.S. Cl. ................... 525/327.6; 525/374; 525/380
[58] Field of Search ..................... 525/327.6

[56] References Cited

U.S. PATENT DOCUMENTS

| Re. 30,238 | 3/1980 | Specht et al. | 44/62 |
|---|---|---|---|
| 3,455,827 | 7/1969 | Mehmedbasich et al. | 525/379 |
| 4,000,986 | 1/1977 | Specht et al. | 44/62 |
| 4,186,116 | 1/1980 | Dhein et al. | 260/23 AR |
| 4,596,863 | 6/1986 | Sackmann et al. | 526/262 |
| 4,900,332 | 2/1990 | Denis et al. | 44/62 |
| 5,013,774 | 5/1991 | Nishida et al. | 525/379 |
| 5,021,514 | 6/1991 | Canova et al. | 525/379 |

FOREIGN PATENT DOCUMENTS

| 1745954 | 9/1971 | Fed. Rep. of Germany . |
| 793776 | 4/1958 | United Kingdom . |
| 1227398 | 4/1971 | United Kingdom . |

*Primary Examiner*—Bernard Lipman
*Attorney, Agent, or Firm*—Joseph C. Gil; Thomas W. Roy

[57] ABSTRACT

The present invention relates to polymers capable of oxidative crosslinking, characterized in that they contain 10 to 80% by weight of structural units corresponding to formula (I) and/or (Ia)

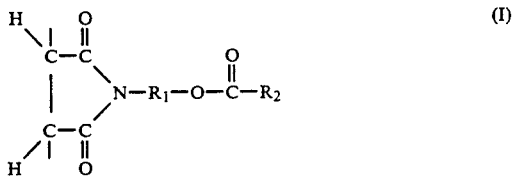

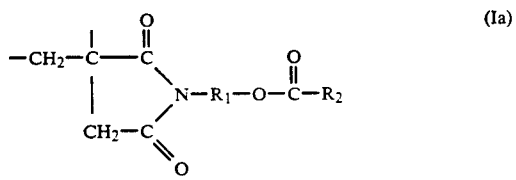

wherein
$R_1$ is an aliphatic saturated hydrocarbon radical containing 2 to 6 carbon atoms, provided that at least 2 carbon atoms are arranged between the nitrogen atom and the oxygen atom, and
$R_2$ at least 30% of the substituents R are monoolefinically or polyolefinically unsaturated hydrocarbon radicals and the remainder, i.e. up to 70% of the substituents $R_2$, are saturated aliphatic and/or aromatic hydrocarbon radicals which may optionally contain oxygen and/or nitrogen as hetero atoms in the form of ether, ester, keto, urethane, urea and/or amide groups, provided that substituent $R_2$ contains at least 2.0% by weight, based on the weight of the polymer, of aliphatically unsaturated double bonds, expressed as C=C (molecular weight=24).

The present invention also relates to a process for the production of these polymers and to the use of these polymers as binders or binder component for coating or sealing compositions.

5 Claims, No Drawings

POLYMERS CAPABLE OF OXIDATIVE CROSSLINKING

BACKGROUND OF THE INVENTION

1. Field the Invention

This invention relates to polymers capable of oxidative crosslinking, to a process for their production by reacting copolymers containing carboxylic anhydride groups with hydroxyalkyl amides of unsaturated carboxylic acids to form imides and to the use of the polymers as binders for coating and sealing compositions.

2. Description of the Prior Art

Oxidatively drying binders based on copolymers are known. They are obtained, for example, by esterification of OH-functional copolymers with drying fatty acids (DE-OS 2,728,568) or by reaction of glycidyl copolymers with drying fatty acids (GB-PS 793,776 and 1,227,398).

Due to their price and certain disadvantages in terms of paint technology, including for example slow drying and overcoating problems attributable to a tendency to pull up the overpainted film, these binders have never been successfully adopted for use in practice.

An object of the present invention is to provide new polymers which are capable of oxidative crosslinking, which may be readily be produced from inexpensive raw materials and which satisfy practical requirements in regard to their performance properties.

This object has been achieved by the polymers according to the invention which are described in detail hereinafter. The polymers according to the invention are derivatives of copolymers containing intramolecular carboxylic anhydride groups. They are produced by reacting these copolymers with reaction products, i.e., primarily hydroxyalkyl amides formed from aminoalcohols and olefinically unsaturated monocarboxylic acids, to form imides.

SUMMARY OF THE INVENTION

The present invention relates to polymers capable of oxidative crosslinking, characterized in that they contain 10 to 80% by weight of structural units corresponding to formula (I) and/or (Ia)

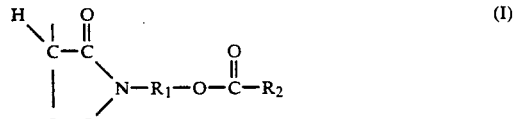

(I)

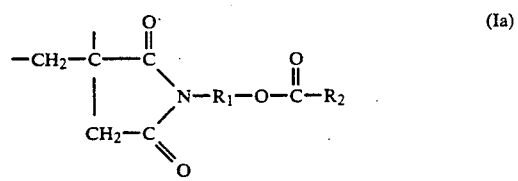

(Ia)

wherein $R_1$ is an aliphatic saturated hydrocarbon radical containing 2 to 6 carbon atoms, provided that at least 2 carbon atoms are arranged between the nitrogen atom and the oxygen atom, and $R_2$ at least 30% of the substituents $R_2$ are monoolefinically or polyolefinically unsaturated hydrocarbon radicals and the remainder, i.e. up to 70% of the substituents $R_2$, are saturated aliphatic and/or aromatic hydrocarbon radicals which may optionally contain oxygen and/or nitrogen as hetero atoms in the form of ether, ester, keto, urethane, urea and/or amide groups, provided that substituent $R_2$ contains at least 2.0% by weight, based on the weight of the polymer, of aliphatically unsaturated double bonds, expressed as C=C (molecular weight=24).

The present invention also relates to a process for the production of these polymers by reacting a) copolymers which have a molecular weight ($M_w$) of 4,500 to 100,000 and an anhydride equivalent weight of 240 to 1,960, are prepared by copolymerizing olefinically unsaturated intramolecular carboxylic anhydrides with other olefinically unsaturated monomers and contain intramolecular carboxylic anhydride groups corresponding to formula (VI) or (VIa)

(VI)

(VIa)

with b) hydroxyalkyl amides corresponding to formula (VII)

(VII)

and based on the reaction product of aminoalcohols corresponding to formula (VIII)

  (VIII)

and monocarboxylic acids corresponding to formula (IX)

  (IX)

at 80° to 200° C. to form imide groups, the reactants being used in amounts which correspond to a molar ratio of anhydride groups of component a) to organically bound nitrogen in component b) of 1:0.5 to 1:1.5.

The present invention further relates to the use of these polymers as binders or binder component for coating or sealing compositions.

DETAILED DESCRIPTION OF THE INVENTION

The copolymers used as starting materials a) for the process according to the invention have a molecular weight ($M_w$, determined by gel permeation chromatography using polystyrene as standard) of 4,500 to 100,000, preferably 8,000 to 50,000, and an anhydride equivalent weight of 240 to 1,960, preferably 320 to 1,250. In the present context, the "anhydride equivalent weight" is the weight for each 1 mole of copolymerized intramolecular anhydride groups.

The copolymers a) are prepared by radical-initiated copolymerization of olefinically unsaturated intramolecular dicarboxylic anhydrides with other olefinically unsaturated monomers.

Suitable monomer mixtures for the copolymerization contain a1) 3 to 40 parts by weight of copolymerizable dicarboxylic anhydrides, such as itaconic anhydride or maleic anhydride, preferably maleic anhydride, a2) 5 to 50 parts by weight of aromatic vinyl compounds, aromatic isopropenyl compounds, vinyl esters, vinyl ethers and mixtures of such monomers, a3) 25 to 92 parts by weight of monomers selected from the group consisting of acrylates containing 1 to 18 carbon atoms in the alcohol portion, methacrylates containing 1 to 18 carbon atoms in the alcohol portion and mixtures of such monomers, a4) 0 to 7 parts by weight of at least difunctional monomers such as divinyl benzene, hexanediol bisacrylates and trimethylol propane (TMP) trisacrylate and a5) 0 to 25 parts by weight of polybutadienes having a molecular weight ($M_n$) of 500 to 3,000, such as Polyol 110 (a product of Chemische Werke Hüls AG)

wherein the total parts by weight of these monomers add up to 100.

Suitable monomers a2) include styrene, α-methyl styrene, vinyl toluene, styrenes substituted by $C_{1-4}$ alkyl groups at the aromatic ring, vinyl acetate, vinyl propionate, vinyl butyrate, ethyl vinyl ether and butyl vinyl ether.

Suitable monomers a3) include ethyl acrylate, n-butyl acrylate, isobutyl acrylate, n-propyl acrylate, n-pentyl acrylate, isopropyl acrylate, hexyl acrylate, 2-ethyl hexyl acrylate, n-octyl acrylate, lauryl acrylate, 2-phenyl ethyl acrylate, benzyl acrylate, stearyl acrylate, cyclohexyl acrylate, n-octyl methacrylate, 2-ethyl hexyl methacrylate, lauryl methacrylate, capric methacrylate, stearyl methacrylate, methyl methacrylate, ethyl methacrylate, n-butyl methacrylate, isobutyl methacrylate, n-hexyl methacrylate and cyclohexyl methacrylate.

Monomer mixtures having the following composition, wherein the percentages add up to 100, are preferably used for preparing copolymers a):

a1) 14 to 30% by weight of maleic anhydride, a2) 15 to 35% by weight of styrene and a3) 35 to 65% by weight of n-butyl acrylate, 2-ethyl hexyl acrylate, 2-ethyl hexyl methacrylate, methyl methacrylate and/or n-butyl methacrylate.

The copolymers are prepared by radical-initiated copolymerization of the monomer mixtures, preferably in organic solution, at solids contents of 30 to 90%.

Suitable solvents include butyl acetate, solvent naphtha, white spirit, xylene, toluene and mixtures of these and other solvents which are not reactive with anhydrides.

Suitable initiators include organic peroxides such as dibenzoyl peroxide, di-tert. butyl peroxide, tert. butyl-peroxy-2-ethyl hexanoate (tert. butyl peroctoate), didecanoyl peroxide, and azo compounds such as azodiisobutyronitrile. The initiators are used in quantities of 0.5 to 10% by weight, preferably 3 to 6% by weight, based on the weight of the monomers.

To obtain the desired molecular weight, regulators, such as n-dodecyl mercaptan, may also be used in quantities of 0.01 to 5% by weight, based on the weight of the monomers.

The copolymerization is generally carried out at a temperature of 60° to 180° C., preferably 110° to 160° C.

To carry out the copolymerization, the solvent and optionally part of the monomer mixture are normally introduced first and heated to the desired reaction temperature. The remaining monomer mixture and the initiator are then continuously added over a period of 3 to 6 hours.

In accordance with the process of the present invention the copolymers containing intramolecular anhydride groups are then reacted with reaction products b) of aminoalcohols and monocarboxylic acids.

Reaction products b) correspond to formula (VII)

and, optionally in small quantities, to formula (VIIa)

In these formulas, $R_1$ and $R_2$ are as defined above. Both here and in the following, $R_1$ is preferably a saturated aliphatic hydrocarbon radical containing 2 or 3 carbon atoms, while $R_2$ is a mono- and/or polyunsaturated aliphatic hydrocarbon radical containing 4 to 20 carbon atoms.

The reaction products b) are prepared by a condensation reaction between aminoalcohols corresponding to formula (VIII)

and carboxylic acids corresponding to formula (IX)

Suitable aminoalcohols corresponding to formula (VIII) include 1-amino-2-ethanol, 1-amino-2-propanol, 1-amino-3-propanol, 2-amino-1-propanol, 1-amino-2-butanol, 1-amino-3-butanol, 2-amino-1-butanol, 2-amino-3-butanol, 3-amino-1-butanol, 1-amino-2-hexanol, 2-amino-1-hexanol and 2-amino-2-methyl propanol; 1-amino-2-ethanol, 1-amino-2-propanol and 2-amino-1-propanol are preferred.

Suitable carboxylic acids corresponding to formula (IX) include oleic acid, lauroleic acid, myristoleic acid, palmitoleic acid, gadoleic acid, erucic acid, castor oil fatty acid, ricinene fatty acid, linoleic acid, linolenic acid, arachidonic acid, sorbic acid, natural fatty acid mixtures (such as for example sunflower oil fatty acid, soybean oil fatty acid, linseed oil fatty acid, peanut oil fatty acid, tall oil fatty acid and palm oil fatty acid), saturated monocarboxylic acids (such as 2-ethyl hexanoic acid, benzoic acid and isononanoic acid); preferably unsaturated and more preferably polyunsaturated monocarboxylic acids are used. Saturated monocarboxylic acids are only used in combination with unsaturated monocarboxylic acids.

In accordance with the definition of substituent $R_2$, the monocarboxylic acids previously mentioned may also be used in admixture with monocarboxylic acids containing ether, ester, keto, urethane, urea or amide groups, although this is less preferred.

At least 30 mole % and preferably the entire quantity of monocarboxylic acids used in the preparation of the reaction products b) are at least monoolefinically unsaturated, preferably polyolefinically unsaturated, aliphatic monocarboxylic acids containing 5 to 21 carbon atoms, more preferably 15 to 21 carbon atoms. In other words $R_2$ preferably represents mono- and/or polyunsaturated hydrocarbon radicals containing 4 to 20, more preferably 14 to 20 carbon atoms.

In the reaction of the aminoalcohols with the monocarboxylic acids, the reactants are used in amounts which correspond to a molar ratio of aminoalcohol to monocarboxylic acid of 1:1 to 2:1, preferably 1:1 to 1.2:1.

The reaction is optionally carried out using suitable entraining agents, such as solvent naphtha, xylene, toluene or gasoline, with elimination of water until the reaction product has an acid value of <3, preferably <1. The entraining agent, if any, and excess aminoalcohol are then removed by distillation.

If the excess aminoalcohol is not distilled off, the quantity of reaction product b) used in the reaction according to the invention must be calculated such that the excess aminoalcohol is also able to react with the anhydride groups of the copolymers a). In this regard it is advisable to keep the concentration of the reaction solution as low as possible to minimize the danger of crosslinking. In this way, hydroxyl groups attached via imide structures corresponding to formulas (X) and (Xa)

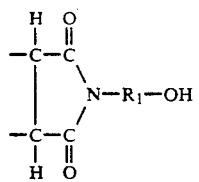
(X)

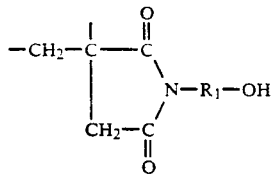
(Xa)

may be additionally incorporated in the polymer. If desired, crosslinking agents, such as organic polyisocyanates, may be added for reaction with the hydroxyl groups.

The reaction according to the invention between anhydride-functional copolymers a) and the reaction products of aminoalcohol and monocarboxylic acids b) generally takes place at reaction temperatures of 80° to 200° C. The reaction is normally carried out by adding the reaction product to the copolymer dissolved in the previously mentioned organic solvents at temperatures of 80° to 150° C. and heating the reaction mixture on a water separator at 100° to 200° C. until the end product has a maximum acid value of 25, preferably a maximum acid value of 10.

The reactants are used in amounts which correspond to a molar ratio of anhydride groups of copolymers a) to chemically bound nitrogen in component b) of 1:0.5 to 1:1.5, preferably 1.05 to 1:1.25, any excess quantities of aminoalcohol corresponding to formula (VIII) which may be present in component b) being included in the calculation. In some cases, it may be advisable, on completion of the reaction, to add an additional small quantity of the reaction product of aminoalcohols and monocarboxylic acid to reduce the acid value of the end product.

On completion of the reaction, the viscosity of the end product may be adjusted by the addition of small quantities of solvent. In general, the polymers according to the invention are used in the form of 30 to 90% by weight solutions in suitable solvents. In addition to the solvents previously disclosed for use in the production process, other suitable solvents include methoxypropyl acetate, butanol, hexanol, pentanol, propanol, ethanol, methyl isobutyl ketone, N-methyl pyrrolidone, ethyl acetate and mixtures of these solvents and/or the solvents previously disclosed for use in the production process.

During the reaction according to the invention, the amide groups present in formula (VII) are largely rearranged into ester groups. The original amide nitrogen atom forms the imide nitrogen atom of the structure (I) or (Ia).

The polymers according to the invention contain 10 to 80% by weight of structural units corresponding to formula (I) or (Ia), preferably 30 to 66% by weight of structural units corresponding to formula (I).

The polymers according to the invention generally contain, except for a few less preferred compounds which are outside this definition, a) 30 to 66% by weight of recurring structural units corresponding to formula (I), b) 3 to 30% by weight of recurring structural units corresponding to formula (II)

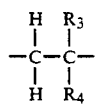
(II)

c) 15 to 67% by weight of recurring structural units corresponding to formulas (III) and/or (IV)

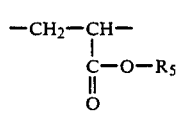
(III)

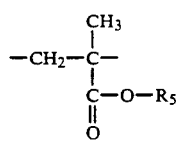
(IV)

and d) 0 to 15% by weight of structural units corresponding to formula (V)

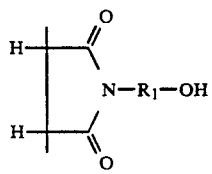
(V)

wherein the percentages add up to 100 and wherein $R_1$ and $R_2$ have the meanings or preferred meanings defined above, $R_3$ is hydrogen, a methyl or ethyl group, chlorine or fluorine, preferably hydrogen, $R_4$ is an aliphatic hydrocarbon radical containing 2 to 15 carbon atoms, a cycloaliphatic hydrocarbon radical containing 5 to 10 carbon atoms, an aromatic hydrocarbon radical containing 6 to 12 carbon atoms, a nitrile group or an organic $C_{1-6}$ radical containing ester, ether, amide, urethane or keto groups, preferably a phenyl radical, $R_5$ is a saturated aliphatic hydrocarbon radical containing 1 to 18, preferably 1 to 10 carbon atoms.

The type of starting materials used in the production of the polymers according to the invention and the quantities in which they are used are selected so that the products contain olefinic double bonds (expressed as C=C, molecular weight=24) in the substituents $R_2$ in a quantity of 2.0 to 10.0% by weight, preferably 3.5 to 8.0%.

The polymers according to the invention may be directly used, i.e., without further additives, as binders for the production of clear coatings.

However, pigments and typical additives, such as drying accelerators, antioxidants, antiskinning agents, viscosity stabilizers, wetting agents, flow control agents and fillers may be added.

Preferred drying accelerators are the known siccatives, e.g., salts of (cyclo)aliphatic monocarboxylic acids containing 6 to 18 carbon atoms with metals such as cobalt, manganese. nickel, chromium, zinc, zirconium, aluminum, calcium, barium and lead.

Pigments, additives and the binders according to the invention may be ground in known manner to form paints.

Suitable mills include sand mills, bead mills, ball mills or triple-roll mills.

The polymers according to the invention may be used in or as air-drying coating compositions for plastics, metals, glass, wood, paper, paperboard and ceramics. Other potential applications for the binders are as printing inks for fabrics or leather and as impregnating or strengthening agents for paper, fabrics or leather.

The coating compositions may be applied by conventional methods, for example, by flood coating, dip coating, spray coating, spread coating, casting and roll coating.

The processing of the polymers according to the invention as binder-containing coating or sealing compositions and their subsequent oxidative crosslinking generally take place at room temperature. However, drying may also be accelerated by forced thermal drying for 5 to 30 minutes at 60° to 120° C.

In the following examples, all parts and percentages are by weight, based on non-volatile solids, unless otherwise specifically stated.

EXAMPLES

Preparation of the monocarboxylic acid/aminoalcohol reaction products

Product A 840 g (3 moles) of soybean oil fatty acid and 840 g (3 moles) of a conjugated-unsaturated $C_{18}$ monocarboxylic acid (Konjuvandol fatty acid, a product of Henkel AG) were introduced under nitrogen into a 3 liter reaction vessel equipped with a stirrer and a cooling and heating system and, after the addition of 366 g (6 moles) of aminoethanol at room temperature, the reaction mixture was heated to 150° C. over a period of 2 hours. The temperature was increased to 150° C. with continuous elimination of water and was kept at that level until the acid value was ≦1. 114 g of water were removed.

Product B 1,260 g (4.5 moles) of soybean oil fatty acid were introduced under nitrogen into a 2 liter reaction vessel equipped with a stirrer and a cooling and heating system and, after the addition of 288.2 g (4.725 moles) of aminoethanol at room temperature, the reaction mixture was heated to 150° C. over a period of 2 hours. The temperature was increased to 190° C. with continuous elimination of water and was kept at that level until the acid value was ≦1. 93 g of water were eliminated. The reaction product was freed from excess aminoethanol by application of a light vacuum.

Product C 1,680 g (6 moles) of soybean oil fatty acid, 1,680 g (6 moles) of peanut oil fatty acid and 122 g (1 mole) of benzoic acid were introduced under nitrogen into a 5 liter reaction vessel equipped with a stirrer and a cooling and heating system. 975 g (13 moles) of 1-amino-2-propanol were added at 60° C. and the reaction mixture was slowly heated to 190° C. with removal of water. The reaction was continued until the acid value was ≦1. 263 g of water were eliminated.

EXAMPLE 1

1,088 g of solvent naphtha were introduced under nitrogen into a 4 liter reaction vessel equipped with a stirrer and a cooling and heating system and heated to 132° C. A mixture of 190 g (19% by weight) of maleic anhydride, 150 g (15% by weight) of n-butyl acrylate, 280 g (28% by weight) of methyl methacrylate, 270 g (27% by weight) of styrene and 60 g (6% by weight) of n-butyl methacrylate was then introduced over a period of 2 hours and, at the same time, 71 g (5% by weight) of a 70% solution of tert. butyl peroctoate in a mixture of hydrocarbons and 33 g of solvent naphtha were added over a period of 2.5 hours, followed by stirring for 1 hour at 130° C. The copolymer solution had a solids content of 46.5%.

After cooling to 120° C., a total of 714 g of monocarboxylic acid/aminoalcohol reaction product A were added in 3 equal portions at intervals of 2 hours. The mixture was then heated to 165° C. with removal of water and was kept at that temperature until the acid value of the resin solution was approximately 3. After the addition of 26 g antiskinning agent (Ascinin R conz, a product of Bayer AG), the mixture was diluted with solvent naphtha to a solids content of 62% and had a viscosity at 23° C. of 1,100 mPa.s.

The equivalent ratio of anhydride incorporated in the copolymer to the monocarboxylic acid/aminoalcohol reaction product added (expressed as monocarboxylic acid ethanolamide, equivalent to the molar ratio of anhydride groups to nitrogen) was 1:1.13.

The polymer contained approximately 48% by weight of the structural unit I

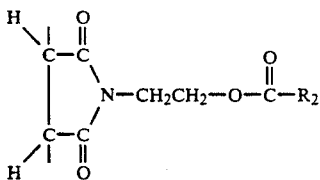

(I)

EXAMPLE 2

1,088 g xylene and 190 g (19% by weight) of maleic anhydride were introduced under nitrogen into a 4 liter reaction vessel equipped with a stirrer and a cooling and heating system and heated to 130° C.

A monomer mixture of 150 g (15% by weight) of n-butyl acrylate, 280 g (28% by weight) of methyl methacrylate, 270 g (27% by weight) of styrene and 60 g (6% by weight) of n-butyl methacrylate was added over a period of 2 hours and, at the same time, a mixture of 71 g (5% by weight of a 70% solution of tert. butyl peroctoate in a mixture of hydrocarbons and 33 g of xylene was added over a period of 2.5 hours. After stirring for 1 hour at 130° C., the mixture was cooled to 120° C. and a total of 714 g of monocarboxylic acid-/aminoalcohol reaction product A was added in 3 equal portions at intervals of 2 hours. The mixture was then heated to 145° C. with removal of water and kept at that temperature until the acid value was 4. After addition of 26 g of the antiskinning agent from Example 1, the mixture was diluted with solvent naphtha to a solids content of 60%. The resulting solution had a viscosity of 600 mPa.s at 23° C.

The polymer contained approximately 48% by weight of structural unit I.

EXAMPLE 3

883 g of xylene and 82.5 g (8.25% by weight) of maleic anhydride were introduced under nitrogen into a 4 liter reaction vessel equipped with a stirrer and a cooling and heating system and heated to 130° C. A mixture of 165 g (16.5% by weight) of maleic anhydride, 231 g (23.1% by weight) of n-butyl acrylate, 263 g (26.3% by weight) of methyl methacrylate and 220 g (22.0% by weight) of styrene was then added over a period of 2 hours and, at the same time, 55 g (3,85% by weight) of a 70% solution of tert. butyl peroctoate in a mixture of hydrocarbons were added over a period of 2.5 hours. After stirring for 1 hour at 130° C., the mixture was cooled to 120° C. and a total of 961.5 g of monocarboxylic acid/aminoalcohol reaction product A was added in 3 equal portions at intervals of 2 hours. The reaction mixture was heated to 150° C. and was kept at that temperature until an acid value of 7 was reached. After the addition of xylene, polymer 3 was obtained in the form of a 62% solution having a viscosity of 4,500 mPa.s/23 ° C.

The polymer contained approximately 60% by weight of structural unit I.

EXAMPLE 4

985 g of white spirit (aliphatic hydrocarbon mixture having a boiling range of 155° to 185° C.) were introduced into a 4 liter reaction vessel equipped with a stirrer and a cooling and heating system and heated to 128° C. A mixture of 225 g (22.5% by weight) of maleic anhydride, 210 g (21% by weight) of n-butyl acrylate, 330 g (33% by weight) of methyl methacrylate and 200 g (20% by weight) of styrene was added over a period of 2 hours and, at the same time, 50 g (3,5% by weight) of 70% solution of tert. butyl peroctoate in a mixture of hydrocarbons were added over a period of 2.5 hours. After stirring for 1 hour at 130° C., the mixture was cooled to 120° C. and a total of 874.5 g of monocarboxylic acid/aminoalcohol reaction product B was added in 3 equal portions at intervals of 2 hours. The reaction mixture was heated to 160° C. and kept at that level until an acid value of approximately 7 was reached.

After the addition of white spirit, binder 4 was obtained in the form of a 60% solution having a viscosity of 11,700 mPa.s/23° C.

The polymer contained approximately 60% by weight of structural unit I.

EXAMPLE 5

1,500 g of the anhydride-functional copolymer solution described in Example 1 were reacted with a total of 501 g of monocarboxylic acid/aminoalcohol reaction product C as described in Example 1.

The reaction was continued until an acid value of 5 was reached. Binder 5 was obtained in the form of a 57.5% solution having a viscosity of 1,400 mPa.s/23° C.

The polymer contained approximately 52% by weight of structural unit I

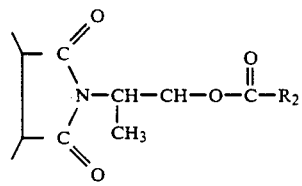

I

EXAMPLE 6

801 g of xylene were heated under nitrogen to 128° C. in a 4 liter reaction vessel equipped with a stirrer and a cooling and heating system. A mixture of 300 g (30% by weight) of maleic anhydride, 290 g (29% by weight) of n-butyl acrylate, 170 g (17% by weight) of methyl methacrylate and 200 g (20% by weight) of styrene was added over a period of 1 hour and, at the same time, 57 g (4,0 by weight) of a 70% solution of a tert. butyl peroctoate in a mixture of hydrocarbons were added over a period of 1.5 hours. After stirring for 1 hour, the mixture was cooled to 120° C. and 969 g of monocarboxylic acid/aminoalcohol reaction product B were added all at once. The reaction mixture was heated to 148° C. with removal of water and was kept at that temperature until the acid value was 23. Another 155 g of reaction product B were then added, after which the mixture was heated at 154° C. until an acid value of approximately 9 was reached. After dilution with xylene, binder 6 was obtained in the form of a 59% solution having a viscosity 1,900 of mPa.s/23° C.

The polymer contained approximately 66% by weight of structural unit I.

USE

White pigmented coating compositions containing titanium dioxide and the binders of Examples 1 to 6 were produced in known manner. The ratio of binder to titanium dioxide was 1:0.8. Ca octoate, Co octoate and Pb octoate were used as drying aids. Unless it was added during production of the binder, an anti-skinning agent was also introduced. The composition was premixed in a mixing vessel, ground in a bead mill after the addition of a little solvent and diluted with a mixture of white spirit and xylene to a viscosity equivalent to a flow time (as measured in a DIN 4 mm cup) of approximately seconds.

Before application, the solution was diluted to spraying viscosity (approximately 25 to 30 seconds flow time). The paints were applied to cleaned glass plates, to steel plates coated with a commercially available filler and directly to cleaned steel plates. The following results were obtained:

| Example | 1 | 2 | 3 | 4 | 5 | 6 |
|---|---|---|---|---|---|---|
| Paints solids (100 sec. flow time, DIN 4 mm cup) | 63% | 70% | 55% | 59% | 60% | 60% |
| Drying (hours) (180 μm wet film, room temperature) | 2.5 | 2 | 3 | 2.5 | 3 | 3 |
| Gloss according to Gardner (20°) | 79 | 80 | 76 | 72 | 80 | 79 |
| Feel[1] | 0 | 0 | 0 | 0 | 0 | 0 |
| Konig pendulum hardness (seconds) | | | | | | |
| 2 days RT | 32 | 24 | 21 | 60 | 36 | 20 |
| 7 days RT | 52 | 45 | 27 | 84 | 55 | 24 |
| Erichsen elasticity (mm) after 1 day/70° C. | 9.0 | 9.0 | 9.0 | 7.5 | 9.0 | 9.0 |
| Resistance to premium gasoline[2] 1 min. after 16 h/RT | 4 | 4 | 2 | 3 | 4 | 4 |
| Adhesion[3] to steel plates after 3 days/RT | 0 | 0 | 1 | 0 | —* | —* |

*Not tested
[1]Feel: 0 = no feel 5 = tacky
[2]Resistance to premium gasoline: 0 = O.K. 5 = heavily dissolved
[3]Adhesion: cross-hatch test acc. to DIN 53 151 0 = best value 5 = worst value The white pigmented coating compositions produced with the binders according to the invention dry quickly to coatings having very good gloss, good mechanical properties and good adhesion. After drying for 16 hours at room temperature, oxidative crosslinking by atmospheric oxygen has clearly advanced as evidenced by the fact that the films already showed a certain resistance to premium gasoline and no longer had any feel.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polymer which may be crosslinked by oxidation and contains 10 to 80% by weight structural units corresponding to formula (I) and/or (Ia)

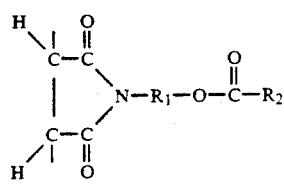

(I)

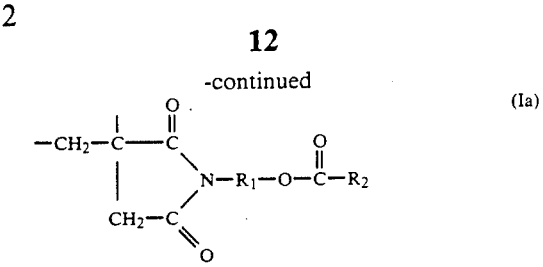

(Ia)

wherein $R_1$ is an aliphatic saturated hydrocarbon radical containing 2 to 6 carbon atoms, provided that at least 2 carbon atoms are arranged between the nitrogen atom and the oxygen atom, and $R_2$ at least 30% of the substituents $R_2$ are monoolefinically or polyolefinically unsaturated hydrocarbon radicals and the remainder of the substituents $R_2$, are saturated aliphatic and/or aromatic hydrocarbon radicals which may optionally contain oxygen and/or nitrogen as hetero atoms in the form of ether, ester, keto, urethane, urea and/or amide groups, provided that substituent $R_2$ contains at least 2.0% by weight, based on the weight of the polymer, of aliphatically unsaturated double bonds (expressed as C=C, molecular weight=24).

2. The polymer of claim 1 which contains 30 to 66% by weight of structural unit I and wherein $R_1$ is an aliphatic, saturated hydrocarbon radical containing 2 or 3 carbon atoms and $R_2$ is a mono- and/or polyunsaturated hydrocarbon radical containing 4 to 20 carbon atoms.

3. The polymer of claim 1 which contains
a) 30 to 66% by weight of recurring structural units corresponding to formula (I),
b) 3 to 30% by weight of recurring structural units corresponding to formula (II)

(II)

c) 15 to 67% by weight of recurring structural units corresponding to formulae (III) and/or (IV)

(III)

(IV)

and d) 0 to 15% by weight of structural units corresponding to formula (V)

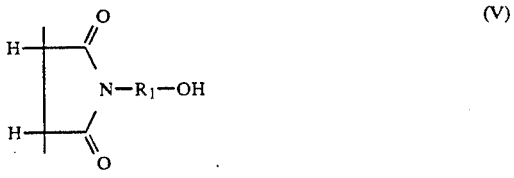

(V)

wherein the percentages add up to 100 and wherein
- $R_3$ is hydrogen, a methyl or ethyl group, fluorine or chlorine,
- $R_4$ is a saturated aliphatic hydrocarbon radical containing 2 to 15 carbon atoms, a saturated cycloaliphatic hydrocarbon radical containing 5 to 10 carbon atoms, an aromatic hydrocarbon radical containing 6 to 12 carbon atoms, a nitrile group or an organic $C_{1-6}$ radical containing ester, ether, amide, urethane or keto groups and
- $R_5$ is a saturated aliphatic hydrocarbon radical containing 1 to 18 carbon atoms.

4. The polymer of claim 3 wherein
- $R_1$ is a saturated aliphatic hydrocarbon radical containing 2 or 3 carbon atoms,
- $R_2$ is a mono- and/or polyunsaturated aliphatic hydrocarbon radical containing 4 to 20 carbon atoms,
- $R_3$ is hydrogen,
- $R_4$ is a phenyl group and
- $R_5$ is a saturated aliphatic hydrocarbon radical containing 1 to 10 carbon atoms.

5. A coating or sealing composition which comprises the polymer of claim 1.

* * * * *